United States Patent
Shuvali et al.

(10) Patent No.: US 10,572,327 B2
(45) Date of Patent: Feb. 25, 2020

(54) DETERMINING SEVERITY OF APPLICATION CRASHES

(71) Applicant: ENTIT Software LLC, Sunnyvale, CA (US)

(72) Inventors: Haim Shuvali, Yehud (IL); Amichai Nitsan, Yehud (IL)

(73) Assignee: MICRO FOCUS LLC, Santa Clara, CA (US)

(*) Notice: Subject to any disclaimer, the term of this patent is extended or adjusted under 35 U.S.C. 154(b) by 51 days.

(21) Appl. No.: 15/744,092

(22) PCT Filed: Jul. 15, 2015

(86) PCT No.: PCT/US2015/040542
§ 371 (c)(1),
(2) Date: Jan. 12, 2018

(87) PCT Pub. No.: WO2017/011000
PCT Pub. Date: Jan. 19, 2017

(65) Prior Publication Data
US 2018/0165146 A1    Jun. 14, 2018

(51) Int. Cl.
*G06F 11/07* (2006.01)
*G06F 11/32* (2006.01)

(52) U.S. Cl.
CPC ...... *G06F 11/0781* (2013.01); *G06F 11/0709* (2013.01); *G06F 11/0715* (2013.01); *G06F 11/32* (2013.01)

(58) Field of Classification Search
CPC . G06F 11/0766; G06F 11/0775; G06F 11/327
USPC .................................................. 714/39, 57
See application file for complete search history.

(56) References Cited

U.S. PATENT DOCUMENTS

| | | | |
|---|---|---|---|
| 7,577,879 B2 | 8/2009 | Lantz et al. | |
| 8,020,149 B2 | 9/2011 | Wolf | |
| 8,516,308 B1 | 8/2013 | Gill et al. | |
| 8,788,944 B1* | 7/2014 | Gill ........................... | G06F 8/61 715/744 |
| 8,990,637 B1 | 3/2015 | Vlachogiannis et al. | |
| 9,842,017 B1* | 12/2017 | Zhang .................. | G06F 11/079 |
| 2003/0160831 A1* | 8/2003 | Ball ..................... | G06F 3/04817 715/835 |

(Continued)

FOREIGN PATENT DOCUMENTS

JP      2011188422 A  *  9/2011
WO    WO-2011057217 A2    5/2011

OTHER PUBLICATIONS

End User Experience Monitoring for Any Application, Any Device and Any User, (Research Paper), Sep. 12, 2013. 3 pgs.

(Continued)

*Primary Examiner* — Chae M Ko

(57) ABSTRACT

In one example of the disclosure, incident data indicative of a crash of an application is obtained, the crash occurring during an access of the application by a user at a computing device. A session depth at which the crash occurred is determined based upon the incident data. Time period data is obtained, the time period data indicative of a time period, following the crash, until the user next accesses the application at the computing device. A severity score for the crash is determined based upon the session depth and the time period.

15 Claims, 8 Drawing Sheets

(56) References Cited

U.S. PATENT DOCUMENTS

| | | | | |
|---|---|---|---|---|
| 2008/0052677 | A1* | 2/2008 | Wolf | G06F 8/62 |
| | | | | 717/124 |
| 2008/0313617 | A1 | 12/2008 | Zhu et al. | |
| 2009/0161554 | A1 | 6/2009 | Agarwal et al. | |
| 2015/0347220 | A1* | 12/2015 | Hermany | G06F 11/0742 |
| | | | | 714/48 |
| 2017/0123887 | A1* | 5/2017 | Bajaj | G06F 11/0781 |
| 2018/0225191 | A1* | 8/2018 | Carey | G06F 11/3636 |

OTHER PUBLICATIONS

International Searching Authority., International Search Report and Written Opinion dated Apr. 12, 2016 for PCT Application No. PCT/US2015/040542 filed Jul. 15, 2015, 12 pgs.

Unknown, "Application Analytics and Monitoring for App Delivery Lifecycle", Splunk, Retrieved from Internet on Sep. 10, 2019, 6 pages. <https://www.splunk.com/en_us/it-operations/application-anaiytics-and-monitoring.html>.

Unknown, "Diagnose Key Performance Issues and Get Crash Reporting", New Relic Mobile, Mar. 24, 2015, 15 pages. <http://newrelic.com/mobile-monitoring/features>.

Unknown, "Features", Crittercism, Mar. 21, 2015, 9 pages. <https://web.archive.org/web/20150321155005/https://www.crittercism.com/features>.

Unknown, "Mobile Real-User Monitoring", AppDynamics, Feb. 6, 2015, 8 pages. <http://www.appdynamics.com/product/mobile-end-user-experience-management/>.

Unknown, "Prioritize and Fix Stability Issues Faster", Firebase Crashlytics, Retreived from Internet on Sep. 18, 2019, 6 pages. <http://try.crashlytics.com/reports/>.

Unknown, "Solution Capabilities", Crittercism, Mar. 19, 2015, 13 pages. <https://web.archive.org/web/201503119131220/https://www.crittercism.com/solution-capabilities>.

* cited by examiner

Application: Financial Product Store
User Experience Score: 85

| Users with Crashes | Screen | Action | Crash Occurrences | Crash Severity Score | Crash Priority |
|---|---|---|---|---|---|
| 150 | Welcome | Launch | 400 | 0 | 3 |
| 50 | Banking | Check Deposit Scan | 100 | 3.5 | 2 |
| 50 | Products | Checkout | 100 | 18 | 1 |

FIG. 5

DETERMINING SEVERITY OF APPLICATION CRASHES

BACKGROUND

Many services are delivered to consumers via applications. In examples, these applications may be composite in that several components work in combination to fulfill the service. The components themselves may be distributed across various physical and virtual devices. For instance, a smartphone, tablet, notebook or other user computing device may serve as a client side user interface component. Through that user interface component, a user may initiate a series of actions carried to be carried out by the user computing device and by server side components to fulfill the service.

DRAWINGS

FIGS. 4 and 5 illustrate an example of a system for determination of application crash severity that includes prioritization based upon crash severity scores and determination of user experience scores.

DETAILED DESCRIPTION

Figure 1:
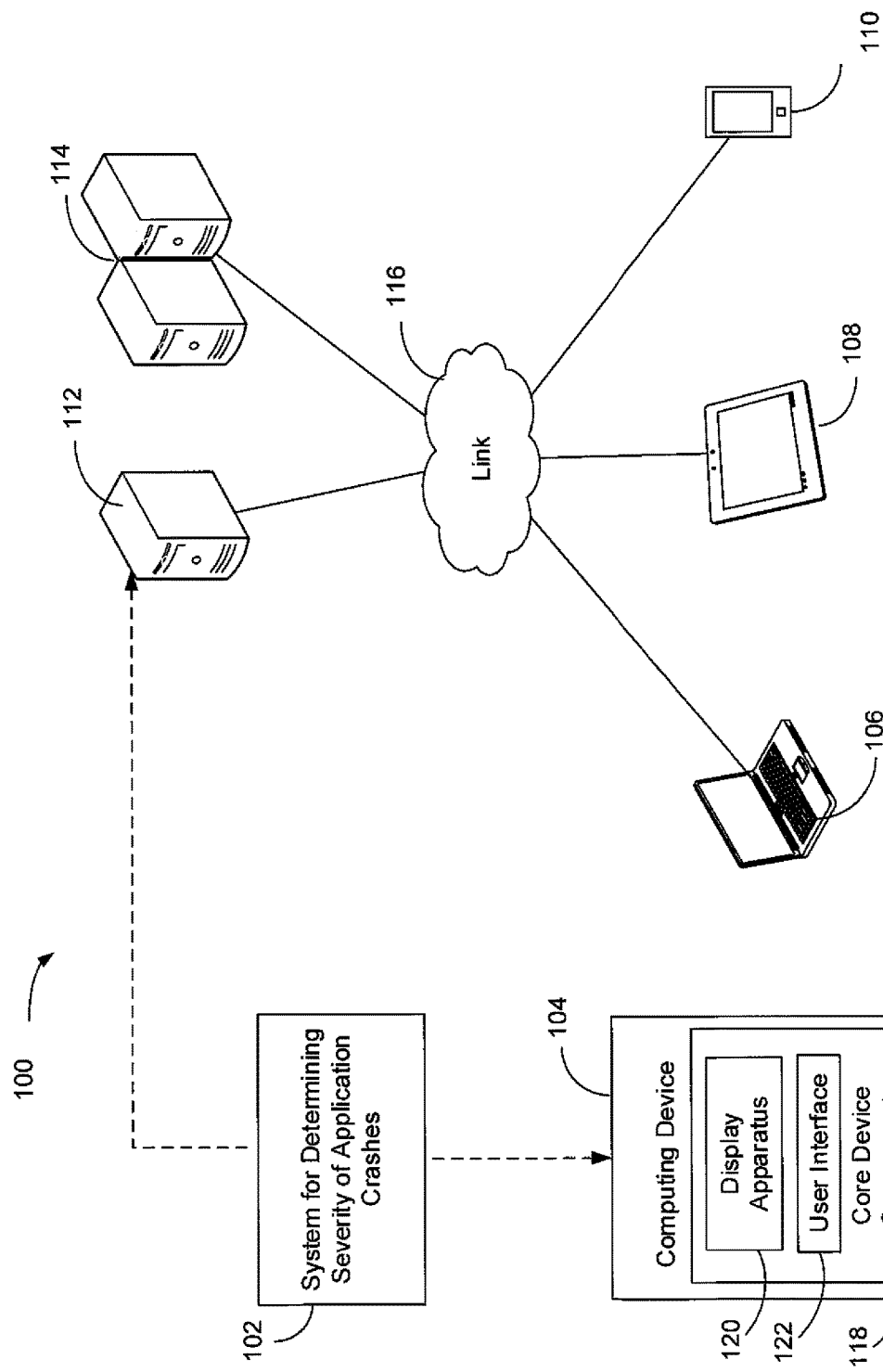
FIG. 1 is a block diagram depicting an example environment in which various examples of the disclosure may be implemented.

INTRODUCTION: For a provider of an application, understanding the user experience and users' satisfaction with the application are key factors to successful implementation. With such an understanding of user experience and satisfaction, the provider of the application can better evaluate the success or likely success of the application and how to invest resources for future development. Some tools may monitor usage of an application to identify crashes that users experience while using the application. Some of such tools may prioritize the reported crashes according a number of crash occurrences or a number of users impacted. However, these tools may not comprehensively consider differences in the impact each type of crash may have on a user's experience, and the user's perception of the severity of the crash.

To address these issues, various examples described in more detail below provide a system and a method for determination of application crash severity that can determine a score reflecting the impact of each crash by analyzing a session depth at which the crash occurs along with user activity after the crash. In examples, incident data indicative of a crash of an application may be obtained, the crash occurring during an access of the application by a user at a computing device. A session depth at which the crash occurred may be determined based upon the incident data. Time period data may be obtained, the time period data being indicative of a time period, following the crash, until the user next accesses the application at the computing device. A severity score for the crash may be determined based upon the session depth and the time period. In certain examples, the severity score may be determined in consideration of application usage by a subject user that experienced the crash compared to an average usage of the application by a set of other users. In certain examples, the application usage may be measured in terms of time of usage of the application, or in terms of frequency of use of the application. In examples, crash severity scores for a set of application crashes are compared, and the crashes are prioritized relative to each other based upon the comparisons. In examples, a user experience score for the application may be determined based upon a crash severity score and a plurality of other indicators of quality of the user's experience with the application, such as speed of application launch, a speed of a user-facing application event other than launch, or a count of non-crash application errors. In examples, a crash severity score for a subject crash, prioritization information for the subject crash, and/or a user experience score determined in consideration of the subject crash may be provided to a computing device for display.

In this manner, the disclosed examples may provide an effective and efficient system and method and system for determining and providing information with respect to severity of an application crash, for prioritizing the application crash relative to a set of crashes, and for assessing user experience with respect to the crashed application. Application providers' and developers' satisfaction with products and services that evaluate user satisfaction and performance of subject applications utilizing the disclosed examples may increase. Likewise, end user satisfaction with the subject applications that are evaluated utilizing the disclosed examples, and with the physical and virtual devices that host or otherwise facilitate the subject applications, may increase.

The following description is broken into sections. The first, labeled "Environment," describes an environment in which various examples may be implemented. The second section, labeled "Components," describes examples of various physical and logical components for implementing various examples. The third section, labeled "Illustrative Example," presents an example of determination of application crash severity. The fourth section, labeled "Operation," describes implementation of various examples.

ENVIRONMENT: FIG. 1 depicts an example environment 100 in which examples may be implemented as a system 102 for determination of application crash severity. Environment 100 is shown to include computing device 104, client devices 106, 108, and 110, server device 112, and server devices 114. Components 104-114 are interconnected via link 116.

Link 116 represents generally any infrastructure or combination of infrastructures to enable an electronic connection, wireless connection, other connection, or combination thereof, to enable data communication between components 104-114. Such infrastructure or infrastructures may include, but are not limited to, a cable, wireless, fiber optic, or remote connections via telecommunication link, an infrared link, or a radio frequency link. For example, link 116 may represent the internet, intranets, and any intermediate routers, switches, and other interfaces. As used herein an "electronic connection" refers generally to a transfer of data between components, e.g., between two computing devices, that are connected by an electrical conductor. A "wireless connection" refers generally to a transfer of data between two components, e.g., between two computing devices, that are not directly connected by an electrical conductor. A wireless connection may be via a wireless communication protocol or wireless standard for exchanging data.

Client devices 106, 108, and 110 represent generally any computing device with which a user may interact to communicate with other client devices, server device 112, and/or server devices 114 via link 116. Server device 112 represents generally any computing device to serve an application and corresponding data for consumption by components 104-110 and 114. Server devices 114 represent generally a group of computing devices collectively to serve an application and corresponding data for consumption by components 104-110 and 112.

Computing device 104 represents generally any computing device with which a user may interact to communicate with client devices 106-110, server device 112, and/or server devices 114 via link 116. Computing device 104 is shown to include core device components 118. Core device components 118 represent generally the hardware and programming for providing the computing functions for which device 104 is designed. Such hardware can include a processor and memory, a display apparatus 120, and a user interface 122. The programming can include an operating system and applications. Display apparatus 120 represents generally any combination of hardware and programming to exhibit or present a message, image, view, or other presentation for perception by a user, and can include, but is not limited to, a visual, tactile or auditory display. In examples, the display apparatus 120 may be or include a monitor, a touchscreen, a projection device, a touch/sensory display device, or a speaker. User interface 122 represents generally any combination of hardware and programming to enable interaction between a user and device 104 such that the user may effect operation or control of device 104. In examples, user interface 122 may be, or include, a keyboard, keypad, or a mouse. In some examples, the functionality of display apparatus 120 and user interface 122 may be combined, as in the case of a touchscreen apparatus that may enable presentation of images at device 104, and that also may enable a user to operate or control functionality of device 104.

System 102, discussed in more detail below, represents generally a combination of hardware and programming to enable determination of severity of application crashes. In some examples, system 102 may be wholly integrated within core device components 118. In other examples, system 102 may be implemented as a component of any of computing device 104, client devices 106-110, server device 112, or server devices 114 where it may take action based in part on data received from core device components 118 via link 116. In other examples, system 102 may be distributed across computing device 104, and any of client devices 106-110, server device 112, or server devices 114. For example, components that implement the incident data engine 202 (FIG. 2) functionality of obtaining incident data indicative of a crash of an application, the session depth engine 204 functionality of determining a session depth at which the crash occurred based upon the incident data, and the time period data engine 206 functionality of obtaining time period data indicative of a time period, following the crash, until the user next accesses the application at the computing device may be included within computing device 104. Continuing with this example, components that implement the scoring engine 208 functionality of determining and providing a severity score for the crash based upon the session depth and the time period may be components included within a server device 112. Other distributions of system 102 across computing device 104, client devices 106-110, server device 112, and server devices 114 are possible and contemplated by this disclosure. It is noted that all or portions of system 102 to enable determination of severity of application crashes may also be included on client devices 106, 108 or 110.

Figure 2:
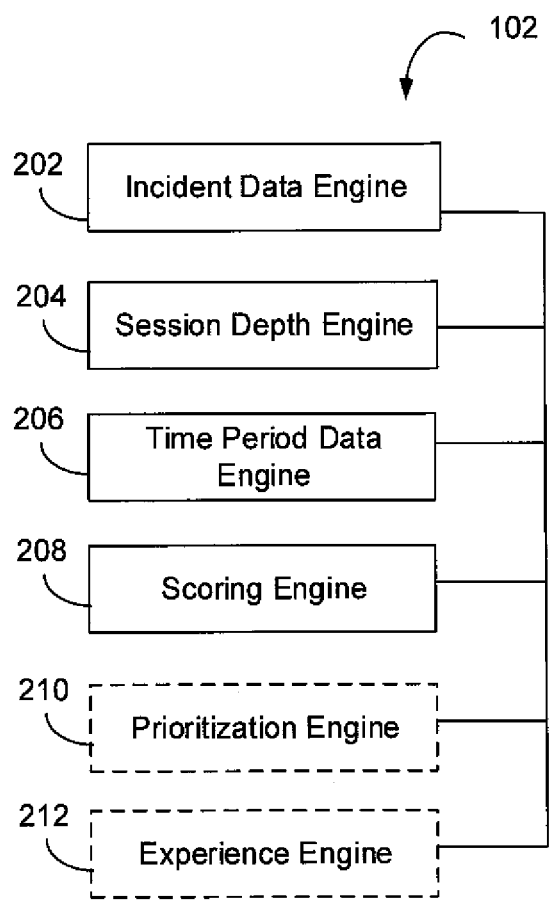
FIG. 2 is a block diagram depicting an example of a system to enable determination of severity of application crashes.
Figure 3:
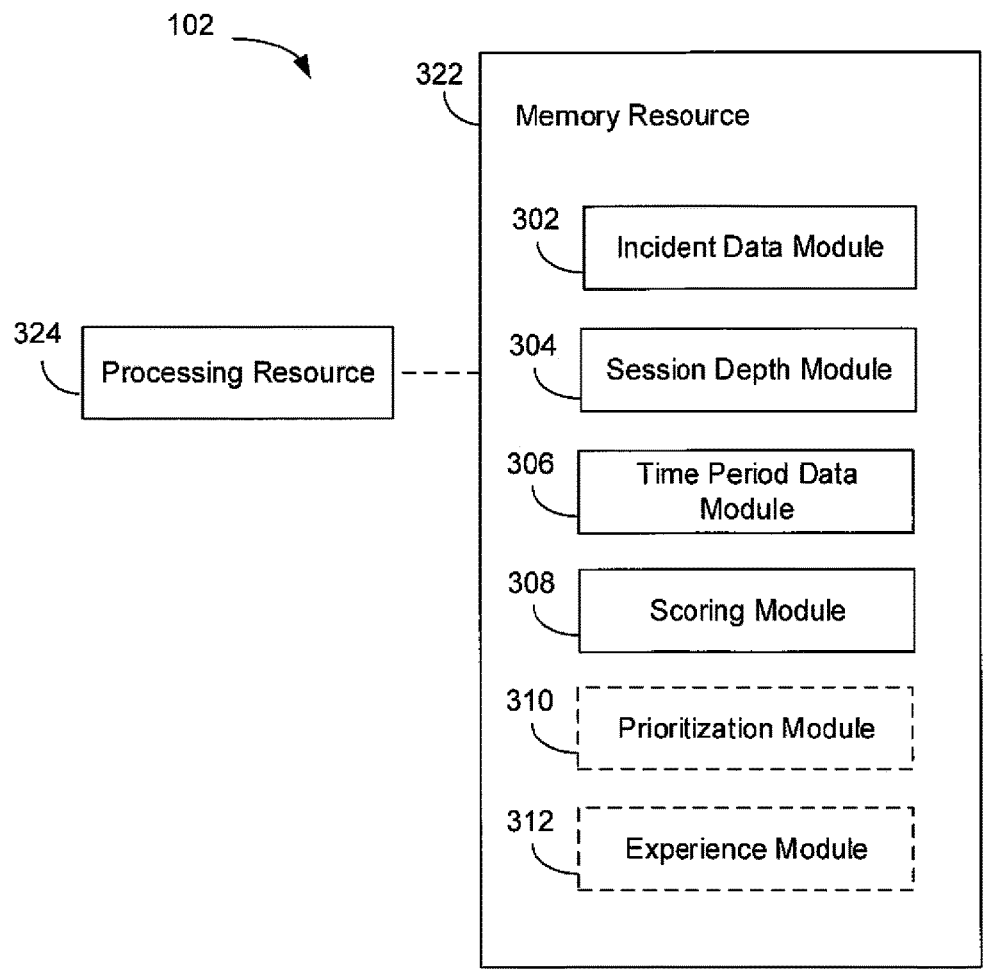
FIG. 3 is a block diagram depicting a memory resource and a processing resource to implement examples of a system to enable determination of severity of application crashes.

COMPONENTS: FIGS. 2 and 3 depict examples of physical and logical components for implementing various examples. In FIG. 2 various components are identified as engines 202, 204, 206, 208, 210, and 212. In describing engines 202-212 focus is on each engine's designated function. However, the term engine, as used herein, refers generally to a combination of hardware and programming to perform a designated function. As is illustrated later with respect to FIG. 3, the hardware of each engine, for example, may include one or both of a processor and a memory, while the programming may be code stored on that memory and executable by the processor to perform the designated function.

FIG. 2 is a block diagram depicting components of a system 102 to enable determination of severity of application crashes. In this example, system 102 includes incident data engine 202, session depth engine 204, time period data engine 206, scoring engine 208, prioritization engine 210, and experience engine 212. In performing their respective functions, engines 202-212 may access a data repository, e.g., any memory accessible to system 102 that can be used to store and retrieve data.

In an example, incident data engine 202 represents generally a combination of hardware and programming to obtain incident data indicative of a crash of an application, wherein the crash is occurring during an access of the application by a user at a computing device. As used herein, "application" refers generally to a software application executing at a client computing device. In an example, the application may be a rich client application. As used herein, a "rich client application" refers generally to an application executing in a computing device that that retrieves data via the Internet. In an example, a rich client application may be written in a programming language such as C/C++ or Java, which has access to some or all of the functions in the computer, and which executes stand-alone without the need of a web browser. In another example, the application could be a web application. As used herein, a "web application" refers generally to an application that is coded in a browser-supported language (such as XML, HTML, or HTML with JavaScript) and is reliant on a web browser application to render the application executable or presentable. Examples of web pages that may include or facilitate web applications are webmail pages, online search engine pages, online sale pages, auction sites pages, and wiki pages. As used herein, a "crash" of an application refers generally to the application experiencing an error that causes a user experience of the application exiting, closing, or freezing without a user instruction to close, exit, or pause the application. As used herein, a "computing device" may be a server, computer networking device, chip set, desktop computer, workstation, mobile computing device, or any other processing device or equipment. The terms "mobile device" and "mobile computing device" are used synonymously, and refer generally to any portable computing device, including, but not limited to, a notebook computer, tablet computer, or smartphone.

Session depth engine 204 represents generally a combination of hardware and programming to determine a session depth at which the crash occurred based upon the obtained incident data. As used herein, a "session" refers generally to a period during which a user interacts with a particular application. The session may be measured in various ways, including but not limited to a passage of a time period, a task (e.g., an editing task) being performed, or a type of content being accessed and/or edited via the application. As used herein, a "session depth" refers generally to a count of stages of a session at a point a crash occurs or occurred.

Continuing with the example of FIG. 2, time period data engine 206 represents generally a combination of hardware and programming to obtain time period data indicative of a time period, following the crash, until the user next accesses the application at the computing device. In examples, the time period data may be obtained from a mobile computing device or other computing device at which the user accesses the application. In other examples, the time period data may be obtained from a server or other computing device that hosts the application that is accessed by the user.

Scoring engine 208 represents generally a combination of hardware and programming to determine and provide a severity score for the crash based upon the session depth and the time period. As used herein, a "severity score" refers generally to a rating or a grade, including but not limited to a numerical or alphabetical score, for the severity of a crash. For instance, a score of "10" on a scale of "1 to 10" may indicate a highest crash severity, or a score of "A" on a scale of "A-J" may indicate a highest crash severity.

Other severity score possibilities are possible and are contemplated by this disclosure. In examples, scoring engine 208 may determine the severity score utilizing a formula with a construct such that, with other factors being equal, an increase in the determined session depth results in an increase in the determined severity score. In this manner, the formula is reflective of an assumption that the farther a user is in the flow of an application at the time of a crash, the more severe is the impact of the crash upon the user.

In examples, scoring engine 208 may determine the severity score utilizing a formula with a construct such that, with other factors being equal, an increase in the time period until the user next accesses the application results in an increase in the determined severity score. In this manner, the formula is reflective of an assumption that a reduction in the user's accessing of the application correlates with the user's abandonment of the application.

In a particular example, the crash analyzed by scoring engine 208 is a crash experienced by a subject user, and the incident data obtained by incident engine 202 includes data indicative of a first measurement of application usage by the subject user compared with a second measurement that is an average usage of the application by other users. In examples the first measurement and second measurement may be measurements of usage occurring after the crash of the application. In other examples, the first measurement and second measurement may be measurements of a time of usage of the application, or may be measurements of a frequency of usage of the application.

In examples, scoring engine 208 provides the determined crash severity score to a computing device for display, wherein the receiving computing device is a device distinct from the computing device at which the application crash occurred. For instance, scoring engine 208 may execute at a server computing device such as server device 112 (FIG. 1) or a group of servers such as server devices 114 (FIG. 1), and send, via link 116, the determined crash severity score to-a distinct computing device, such as a client notebook computing device 106, for display to a user via a display component included in or connected to the distinct computing device. As used herein, "display" refers generally to exhibition or presentation caused by a computer for the purpose of perception by a user. In examples, a display may be a display to be presented at a computer monitor, touchscreen, projection device, or other electronic display component. As used herein, a "display component" refers generally to any combination of hardware and programming to exhibit or present content, a message, or other information for perception by a user, and can include, but is not limited to, a visual, tactile or auditory display. In particular examples, the display may be in a form to be presented at a monitor, display screen, or touchscreen component of a computing device. In examples, the display may include a graphic user interface to enable user interaction with the display. As used herein, "graphic user interface" and "GUI" are used synonymously, and refer generally to any type of display caused by an application that can enable a user to interact with the application via visual properties of the display.

System 102 may include a prioritization engine 210. In these examples, prioritization engine 210 represents generally a combination of hardware and programming to compare a set of subject severity scores, and to prioritize the crashes relative to each other based upon the comparisons.

In examples, prioritization engine 210 is to provide the information regarding prioritization of the crashes to a computing device for display, wherein that computing device is a device distinct from the computing devices at which the application crashes occurred. For instance, prioritization engine 210 may execute at a server computing device such as server device 112 (FIG. 1) or a group of servers such as server devices 114 (FIG. 1), and send, via link 116, the crash prioritization information to a separate client notebook computing device 106, for display to a user.

System 102 may include an experience engine 212. In these examples, experience engine 212 represents generally a combination of hardware and programming to determine and providing a user experience score for the application based upon a determined crash severity score and based upon a set of indicators of quality of the user's experience with the application other than indicators relating to application crashes. In examples, the set of other, non-crash, quality indicators may include a measured speed of launch of the application. In other examples, the set of other, non-crash, quality indicators may include a measured speed of a user-facing application event other than launch (e.g., a search result or other response time, a screen refresh time, a time to complete a cart checkout event, etc.). In other examples, the set of other, non-crash, quality indicators may include a count of application errors for events other than application crashes (e.g., returns of incorrect results, slow performance or lags, display errors, etc.).

In examples, experience engine 212 is to provide the user experience score to a computing device for display, wherein that computing device is a device distinct from the computing devices at which the application crashes occurred. For instance, experience engine 212 may execute at a server computing device such as server device 112 (FIG. 1) or a group of servers such as server devices 114 (FIG. 1), and send, via link 116, the user experience information to a separate client notebook computing device 106, for display to a user.

In examples, incident data engine 202 may obtain incident data and/or time period data engine 204 may obtain the time period data over a link 116 via a networking protocol. In examples, scoring engine 208 may provide a severity score for a crash, prioritization engine 210 may provide a prioritization of crashes, and/or experience engine 212 may provide a user experience score over a link 116 via a networking protocol. In examples the networking protocols may include, but are not limited to, Transmission Control Protocol/Internet Protocol ("TCP/IP"), HyperText Transfer Protocol ("HTTP"), and/or Session Initiation Protocol ("SIP").

In the foregoing discussion of FIG. 2, engines 202-212 were described as combinations of hardware and programming. Engines 202-212 may be implemented in a number of fashions. Looking at FIG. 3 the programming may be processor executable instructions stored on a tangible memory resource 322 and the hardware may include a processing resource 324 for executing those instructions. Thus memory resource 322 can be said to store program instructions that when executed by processing resource 324 implement system 102 of FIG. 2.

Memory resource 322 represents generally any number of memory components capable of storing instructions that can be executed by processing resource 324. Memory resource 322 is non-transitory in the sense that it does not encompass a transitory signal but instead is made up of more or more memory components to store the relevant instructions. Memory resource 322 may be implemented in a single device or distributed across devices. Likewise, processing resource 324 represents any number of processors capable of executing instructions stored by memory resource 322. Processing resource 324 may be integrated in a single device or distributed across devices. Further, memory resource 322 may be fully or partially integrated in the same device as processing resource 324, or it may be separate but accessible to that device and processing resource 324.

In one example, the program instructions can be part of an installation package that when installed can be executed by processing resource 324 to implement system 102. In this case, memory resource 322 may be a portable medium such as a CD, DVD, or flash drive or a memory maintained by a server from which the installation package can be downloaded and installed. In another example, the program instructions may be part of an application or applications already installed. Here, memory resource 322 can include integrated memory such as a hard drive, solid state drive, or the like.

In FIG. 3, the executable program instructions stored in memory resource 322 are depicted as incident data module 302, session depth module 304, time period data module 306, scoring module 308, prioritization module 310, and experience module 312. Incident data module 302 represents program instructions that when executed by processing resource 324 may perform any of the functionalities described above in relation to incident data engine 202 of FIG. 2. Session depth module 304 represents program instructions that when executed by processing resource 324 may perform any of the functionalities described above in relation to session depth engine 204 of FIG. 2. Time period data module 306 represents program instructions that when executed by processing resource 324 may perform any of the functionalities described above in relation to time period data engine 206 of FIG. 2. Scoring module 308 represents program instructions that when executed by processing resource 324 may perform any of the functionalities described above in relation to scoring engine 208 of FIG. 2. Prioritization module 310 represents program instructions that when executed by processing resource 324 may perform any of the functionalities described above in relation to prioritization engine 210 of FIG. 2. Experience module 312 represents program instructions that when executed by processing resource 324 may perform any of the functionalities described above in relation to experience engine 212 of FIG. 2.

ILLUSTRATIVE EXAMPLE

Figure 4:
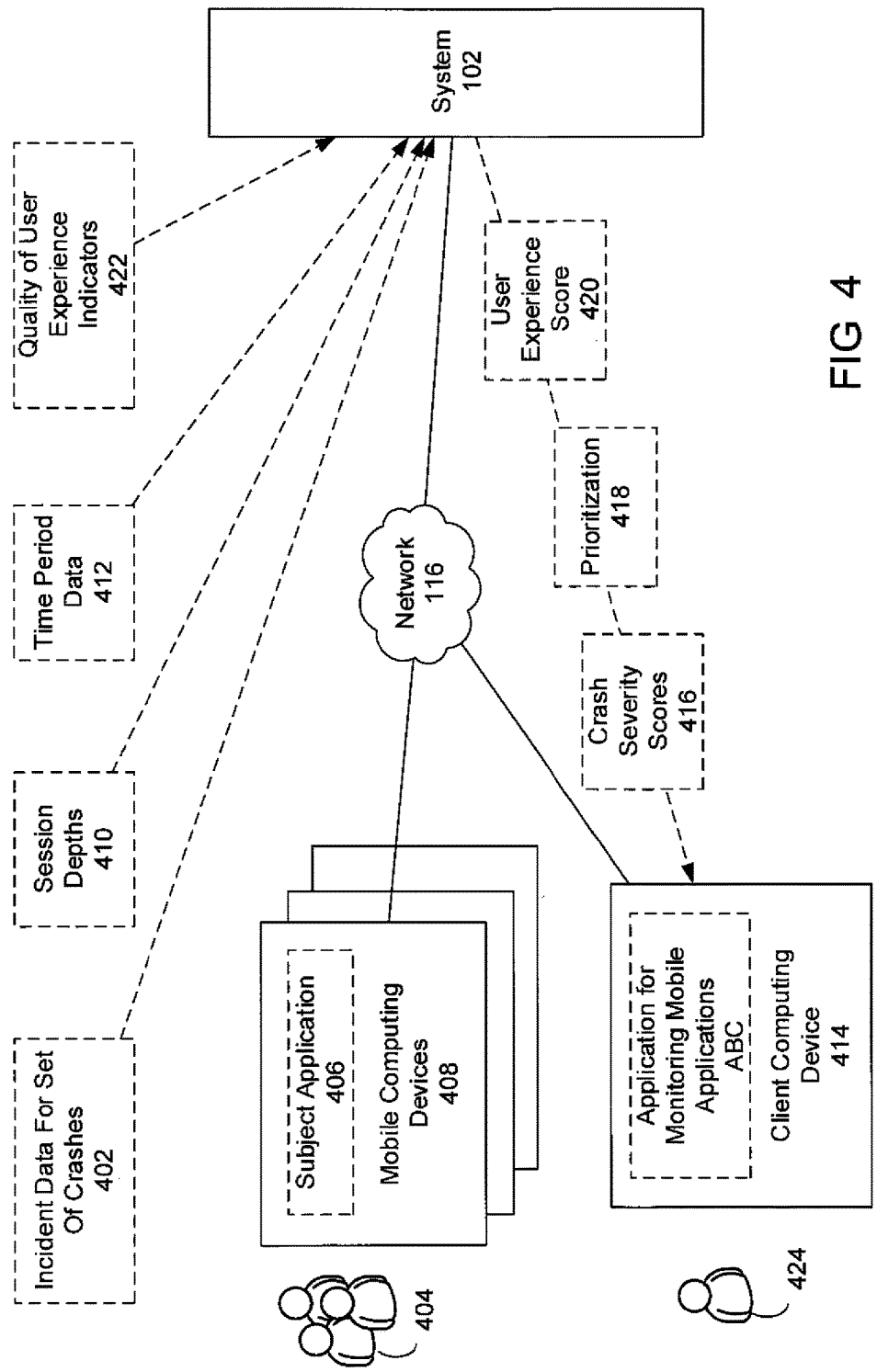

FIGS. 4 and 5, in view of FIGS. 1 and 2, illustrate an example of a system 102 for determining severity of application crashes. In examples, system 102 may be hosted at a computer system such as server device 112 (FIG. 1) or distributed over a set of computer systems such as server system 114 (FIG. 1). Beginning at FIG. 4, in this example, system 102, for each of a plurality of crashes occurring during access of the application by a user at a mobile computing device of a set of mobile computing devices 408, receives, retrieves or otherwise obtains via a network 116 incident data 402 indicative of the crash. In this example, we assume that users 404 interact with an application 406 at mobile computing devices 408, and the incident data 402 includes data over a thirty day period indicative of the following Crashes A-C experienced by the users 404 at the mobile computing device:

Crash A: User 1111 at Day 1: launched app→crashed. Launched again same Day 1.

Crash B, User 1243 at Day 5: launched app→sign-in→banking→select→check deposit→scan→crashed. Launched again 2 days later at Day 7.

Crash C, User 1359 at Day 1: launched app→sign-in→products→select→checkout→pay→crashed. User never returned to application during test period.

System 102 determines a session depth 410 at which each of Crash A, Crash B, and Crash C occurred. In this example, the session depth for Crash A is determined to be at depth "0", the session depth for Crash B is determined to be at depth "5", and the session depth for Crash C is determined to be at depth "5."

Continuing at FIG. 4, system 102, for each of Crash, A, Crash B, and Crash C, obtains time period data indicative of a time period, following the crash, until the user next accesses the application at the first computing device. In this example, the time period for the next access of the application by the user is determined to be zero days (Day 1 to Day 1) for Crash A. The time period for the next access of the application by the user 404 is determined to be two days (Day 5 to Day 7) for Crash B. The time period for the next access of the application by the user 404 is determined to be 31 days (Day 1 to "user never returned") for Crash C. In this example, "31 days" is the default value when it is determined that the user did not return to the subject application during the 30 day measured timeframe.

System 102 determines, and provides to client computing device 414 via network 116, a severity score 416 for each of Crash A, Crash B, and Crash C based upon the determined session depths 410 and the determined time period 412. In this example, we assume system 102 calculates a severity score 416 according to the following formula:

Severity Score=Weight 50% (Session Depth)+ Weight 50% (Re-use Time Period)

Continuing with the example of FIG. 4, the severity scores for Crashes "A"-"C" are determined as follows:

Crash *A* Severity Score=50%(0 steps)+ 50%(0 days)=0

Crash *B* Severity Score=50%(5 steps)+ 50%(2 days)=3.5

Crash *C* Severity Score=50%(5 steps)+ 50%(31 days)=18

It should be noted that other weightings and other formulas are possible and are contemplated by this disclosure. For instance, in other examples incident data 402 may include usage gap data indicative of application usage by a first user of the subject application 406 compared to average usage of the subject application by a set of other users, and in such examples system 102 may determine crash severity scores according to a formula that takes into account such usage gap data.

Continuing at FIG. 4, system 102 compares the severity scores 416 to prioritize Crash A, Crash B, and Crash C relative to each other based upon the comparisons. In this example, system 102 prioritizes the set of crashes according to the crash severity scores 416, such that Crash C has the highest priority, Crash B has secondary priority, and Crash A has the lowest priority of the set of three crashes. System 102 provides the prioritizations to client computing device 414 via network 116.

Continuing at FIG. 4, in certain examples, system 102 may determine and provide to client computing device 414 via network 116 a user experience score 420 for the subject application 406 based upon the crash severity scores 416 and a set of other indicators 422 of quality of the user's experience with the subject application 406. In examples, the set of other indicators of quality of the experience of a user 404 with the subject application may include, but are not limited to, speed of launch of the subject application, speed of a user-facing application event other than launch (e.g. an application calculation period, or an indicator of accuracy of results returned by the subject application), and a count of subject application errors that are not crash errors.

FIG. 5, in view of FIG. 4, is an example of a display 502 to be presented at client computing device 414 (FIG. 4), e.g., a display for the benefit of an application provider or application developer user 424 (FIG. 4). The display 502 includes an aggregation of six hundred occurrences 504 of the "Launch" 506, "Check Deposit Scan" 508, and "Crash Severity Score" 510 crashes represented by Crash A, Crash B, and Crash C, respectively, the aggregation compiled by system 102 tracking crashes of the subject application 406 experienced by two hundred fifty users 404 of the subject application. In this manner, the severity of each of the crashes was determined in consideration of how deep the user was in the user's flow at the time of the crash, and the length of time before the use returned to reuse the application after experiencing the crash. In this example, the display 502 additionally includes a user experience score 420 for the subject application 406 determined based upon the crash severity scores 416 (FIG. 4) and a set of other indicators 422 (FIG. 4) of quality of the user's experience with the subject application.

Figure 6:
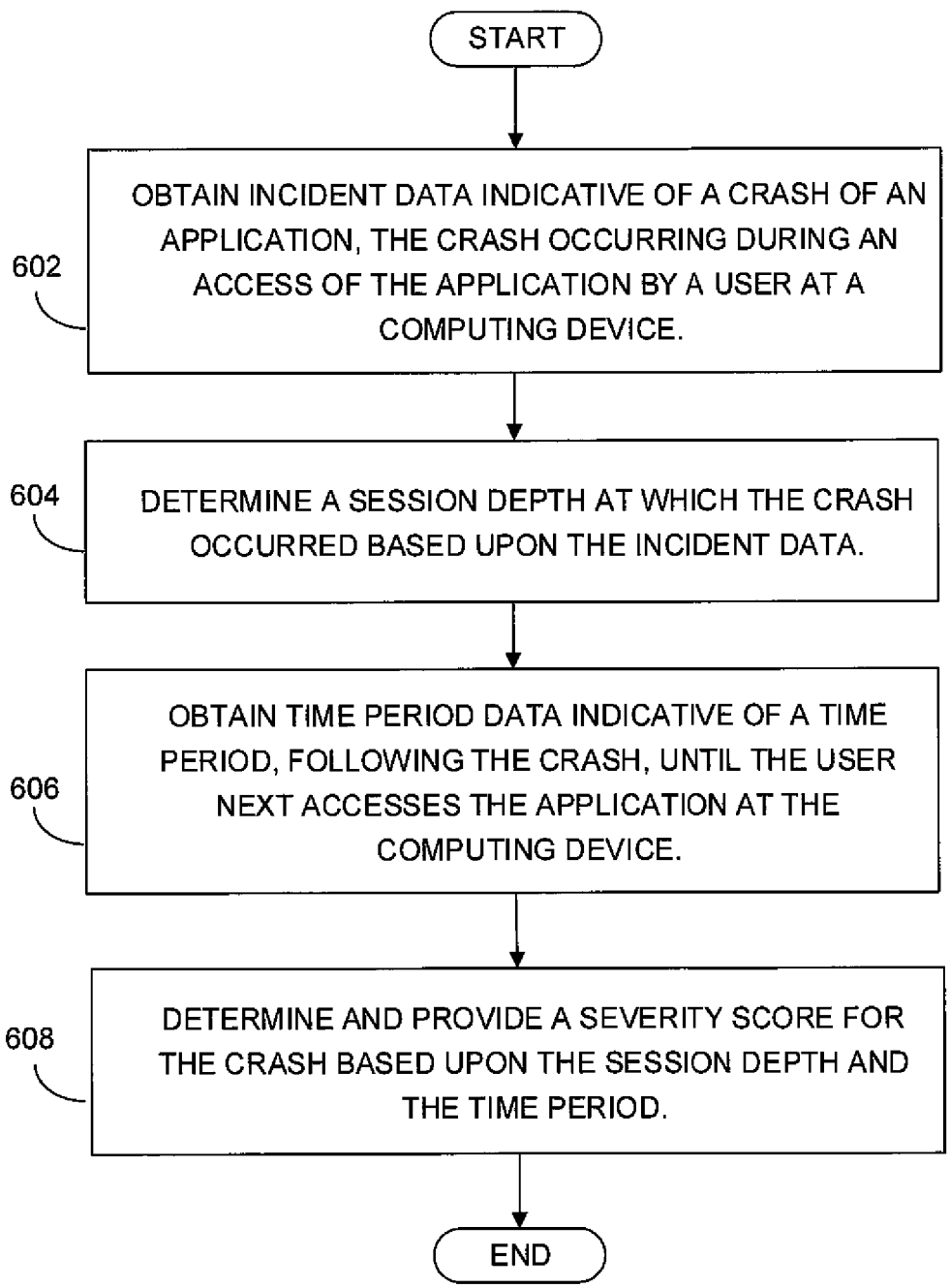
FIG. 6 is a flow diagram depicting implementation of an example of a method to determine application crash severity.

OPERATION: FIG. 6 is a flow diagram of implementation of a method to determine application crash severity. In discussing FIG. 6, reference may be made to the components depicted in FIGS. 2 and 3. Such reference is made to provide contextual examples and not to limit the manner in which the method depicted by FIG. 6 may be implemented. Incident data indicative of a crash of an application is obtained. The crash is a crash occurring during an access of the application by a user at a computing device (block 602). Referring back to FIGS. 2 and 3, incident data engine 202 (FIG. 2) or incident data module 302 (FIG. 3), when executed by processing resource 324, may be responsible for implementing block 602.

A session depth at which the crash occurred is determined based upon the incident data (block 604). Referring back to FIGS. 2 and 3, session depth engine 204 (FIG. 2) or session depth module 304 (FIG. 3), when executed by processing resource 324, may be responsible for implementing block 604.

Time period data is obtained. The time period data is indicative of a time period, following the crash, until the user next accesses the application at the computing device (block 606). Referring back to FIGS. 2 and 3, time period data engine 206 (FIG. 2) or time period data module 306 (FIG. 3), when executed by processing resource 324, may be responsible for implementing block 606.

A severity score for the crash is determined and provided based upon the session depth and the time period (block 608). Referring back to FIGS. 2 and 3, scoring engine 208 (FIG. 2) or scoring module 308 (FIG. 3), when executed by processing resource 324, may be responsible for implementing block 608.

Figure 7:
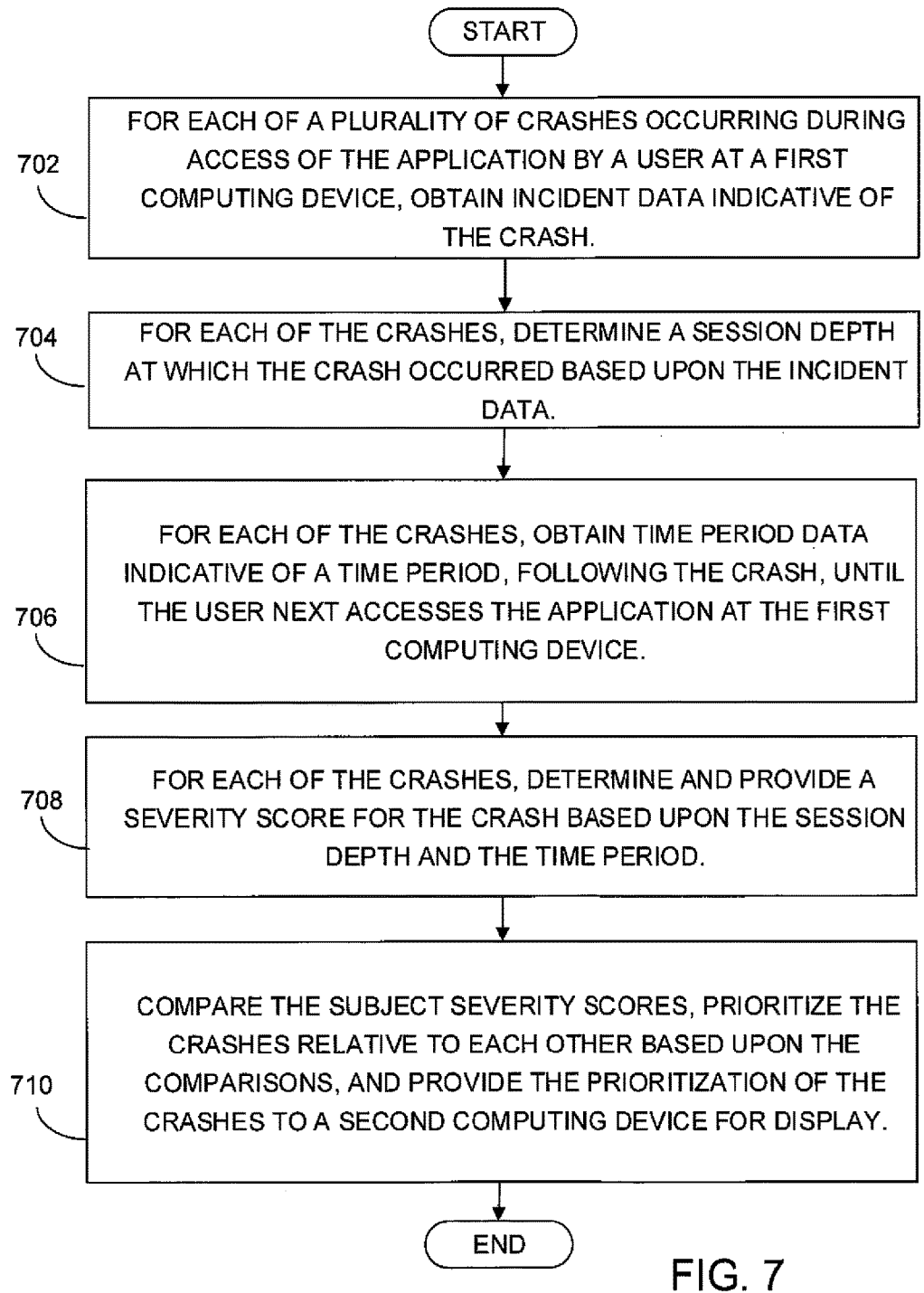
FIG. 7 is a flow diagram depicting implementation of an example of a method for determining severity of application crashes including prioritization based upon crash severity scores.

FIG. 7 is a flow diagram of implementation of a method to determine application crash severity that includes prioritization based upon crash severity scores. In discussing FIG. 7, reference may be made to the components depicted in FIGS. 2 and 3. Such reference is made to provide contextual examples and not to limit the manner in which the method depicted by FIG. 7 may be implemented. For each of a plurality of crashes occurring during access of the application by a user at a first computing device, incident data indicative of the crash is obtained (702). Referring back to FIGS. 2 and 3, incident data engine 202 (FIG. 2) or incident data module 302 (FIG. 3), when executed by processing resource 324, may be responsible for implementing block 702.

A session depth at which the crash occurred is determined for each of the crashes based upon the incident data (block 704). Referring back to FIGS. 2 and 3, session depth engine 204 (FIG. 2) or session depth module 304 (FIG. 3), when executed by processing resource 324, may be responsible for implementing block 704.

Time period data is obtained for each of the crashes, the time period data indicative of a time period, following the crash, until the user next accesses the application at the first computing device (block 706). Referring back to FIGS. 2 and 3, time period data engine 206 (FIG. 2) or time period data module 306 (FIG. 3), when executed by processing resource 324, may be responsible for implementing block 706.

A severity score for each of the crashes is determined based upon the session depth and the time period and is provided (block 708). Referring back to FIGS. 2 and 3, scoring engine 208 (FIG. 2) or scoring module 308 (FIG. 3), when executed by processing resource 324, may be responsible for implementing block 708.

The subject severity scores are compared to prioritize the crashes relative to each other based upon the comparisons, and the prioritization of the crashes is provided to a second computing device for display (block 710). Referring back to FIGS. 2 and 3, prioritization engine 210 (FIG. 2) or prioritization module 310 (FIG. 3), when executed by processing resource 324, may be responsible for implementing block 710.

Figure 8:
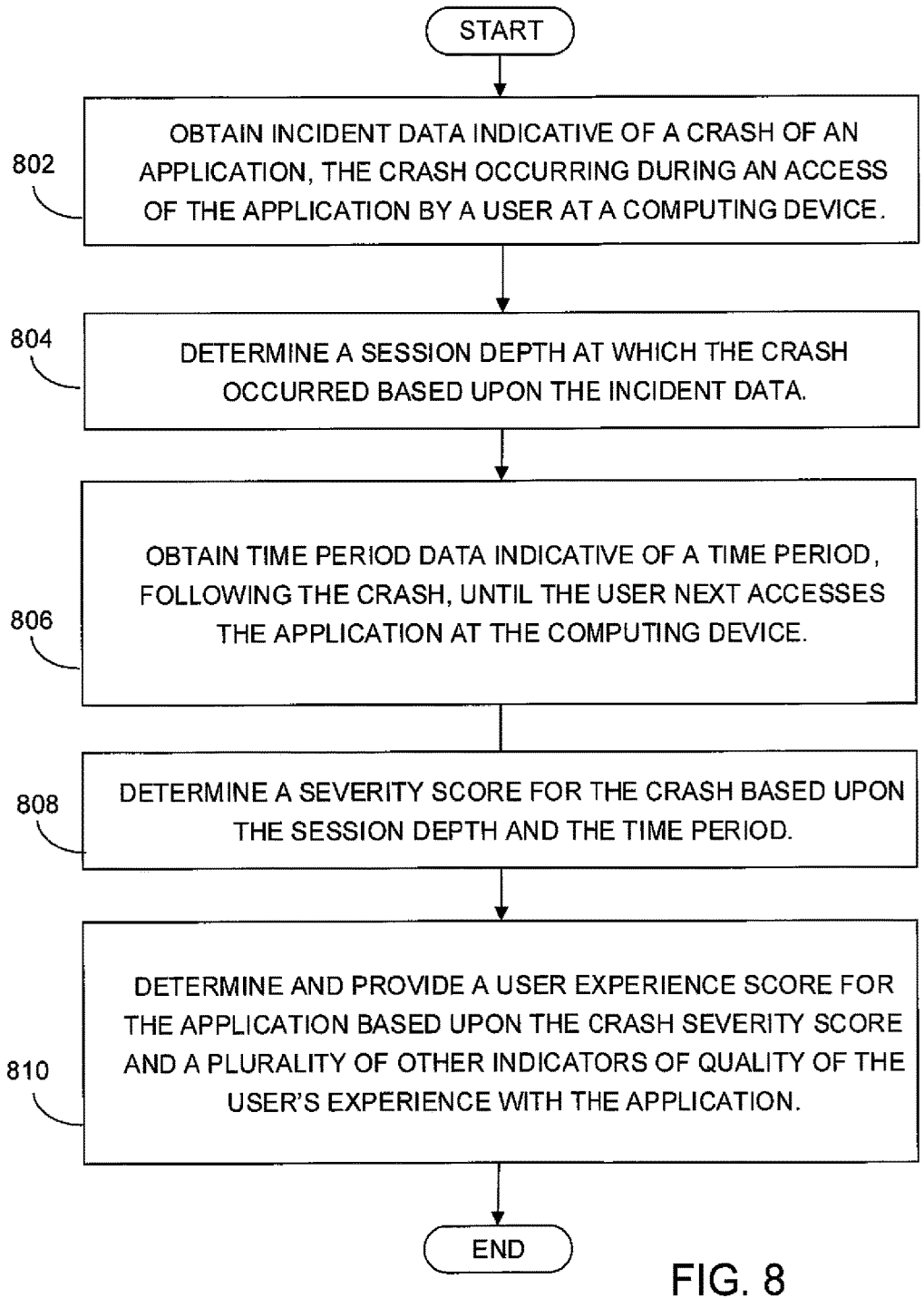
FIG. 8 is a flow diagram depicting implementation of an example of a method for determining severity of application crashes including determination of, user experience scores.

FIG. 8 is a flow diagram of implementation of a method for determining severity of application crashes that includes determining of user experience scores. In discussing FIG. 8, reference may be made to the components depicted in FIGS. 2 and 3. Such reference is made to provide contextual examples and not to limit the manner in which the method depicted by FIG. 8 may be implemented. Incident data indicative of a crash of an application is obtained. The crash is a crash occurring during an access of the application by a user at a computing device (block 802). Referring back to FIGS. 2 and 3, incident data engine 202 (FIG. 2) or incident data module 302 (FIG. 3), when executed by processing resource 324, may be responsible for implementing block 802.

A session depth at which the crash occurred is determined based upon the incident data. Referring back to FIGS. 2 and 3, session depth engine 204 (FIG. 2) or session depth module 304 (FIG. 3), when executed by processing resource 324, may be responsible for implementing block 804.

Time period data is obtained. The time period data is indicative of a time period, following the crash, until the user next accesses the application at the computing device (block 806). Referring back to FIGS. 2 and 3, time period data engine 206 (FIG. 2) or time period data module 306 (FIG. 3), when executed by processing resource 324, may be responsible for implementing block 806.

A severity score is determined for the crash based upon the session depth and the time period (block 808). Referring back to FIGS. 2 and 3, scoring engine 208 (FIG. 2) or scoring module 308 (FIG. 3), when executed by processing resource 324, may be responsible for implementing block 808.

A user experience score for the application is determined, based upon the crash severity score and a plurality of other indicators of quality of the uses experience with the application, and provided (block 810). Referring back to FIGS. 2 and 3, experience engine 212 (FIG. 2) or experience module 312 (FIG. 3), when executed by processing resource 324, may be responsible for implementing block 810.

CONCLUSION: FIGS. 1-8 aid in depicting the architecture, functionality, and operation of various examples. In particular, FIGS. 1, 2 and, 3 depict various physical and logical components. Various components are defined at least in part as programs or programming. Each such component, portion thereof, or various combinations thereof may represent in whole or in part a module, segment, or portion of code that comprises executable instructions to implement any specified logical function(s). Each component or various combinations thereof may represent a circuit or a number of interconnected circuits to implement the specified logical function(s). Examples can be realized in any memory resource for use by or in connection with processing resource. A "processing resource" is an instruction execution system such as a computer/processor based system or an ASIC (Application Specific Integrated Circuit) or other system that can fetch or obtain instructions and data from computer-readable media and execute the instructions contained therein. A "memory resource" is any non-transitory storage media that can contain, store, or maintain programs and data for use by or in connection with the instruction execution system. The term "non-transitory" is used to clarify that the term media, as used herein, does not encompass a signal. Thus, the memory resource can comprise any one of many physical media such as, for example, electronic, magnetic, optical, electromagnetic, or semiconductor media. More specific examples of suitable computer-readable media include, but are not limited to, hard drives, solid state drives, random access memory (RAM), read-only memory (ROM), erasable programmable read-only memory, flash drives, and portable compact discs.

Although the flow diagrams of FIGS. 6, 7 and 8 show specific orders of execution, the order of execution may differ from that which is depicted. For example, the order of execution of two or more blocks or arrows may be scrambled relative to the order shown. Also, two or more blocks shown in succession may be executed concurrently or with partial concurrence. Such variations are within the scope of the present disclosure.

The present disclosure has been shown and described with reference to the foregoing examples. It is to be understood, however, that other forms, details and examples may be made without departing from the spirit and scope of this application that is protected by the following claims. The features disclosed in this specification (including any accompanying claims, abstract and drawings), and/or the blocks or stages of any method or process so disclosed, may be combined in any combination, except combinations where at least some of such features, blocks and/or stages are mutually exclusive.

What is claimed is:

1. A system for determining severity of a crash of an application, comprising:
    an incident data engine, to obtain incident data indicative of the crash of the application, the crash occurring during an access of the application by a user at a computing device;
    a session depth engine, to determine a session depth at which the crash occurred based upon the incident data;
    a time period data engine, to obtain time period data indicative of a time period, following the crash, until the user next accesses the application at the computing device; and
    a scoring engine, to determine a severity score for the crash based upon the session depth and the time period.

2. The system of claim 1, wherein the scoring engine is to determine the severity score utilizing a formula with a construct such that an increase in the determined session depth results in an increase in the determined severity score.

3. The system of claim 1, wherein the scoring engine is to determine the severity score utilizing a formula with a construct such that an increase in the time period until the user next accesses the application results in an increase in the determined severity score.

4. The system of claim 1, wherein the computing device is a mobile computing device.

5. The system of claim 1, wherein the application is a rich client application or a web application.

6. The system of claim 1, wherein the user is a first user, and wherein the incident data includes usage gap data indicative of a first measurement of application usage by the first user compared to a second measurement that is an average usage of the application by a plurality of other users.

7. The system of claim 6, wherein the first measurement is a measurement of usage occurring after the crash of the application.

8. The system of claim 6, wherein the first and second usage measurements are measurements of time of usage of the application.

9. The system of claim 6, wherein the first and second usage measurements are measurements of frequency of usage of the application.

10. The system of claim 1, wherein scoring engine provides the crash severity score to a third computing device for display.

11. A memory resource storing instructions that when executed cause a processing resource to determine severity of application crashes, the instructions comprising:
    an incident data module, that when executed causes the processing resource to, for each of a plurality of crashes occurring during access of an application by a user at a first computing device, obtain incident data indicative of the crash;

a session depth module, that when executed causes the processing resource to, for each of the plurality of crashes, determine a session depth at which the crash occurred based upon the incident data;

a time period data module, that when executed causes the processing resource to, for each of the plurality of crashes, obtain time period data indicative of a time period, following the crash, until the user next accesses the application at the first computing device; and a scoring module, that when executed causes the processing resource to, for each of the plurality of crashes, determine and provide a severity score for the crash based upon the session depth and the time period; and a prioritization module, that when executed causes the processing resource to compare the severity scores, to prioritize the plurality of crashes relative to each other based upon the comparisons, and to provide the prioritization of the plurality of crashes to a second computing device for display.

12. The memory resource of claim 11, wherein the scoring module when executed is to determine the severity score utilizing a formula with a construct such that an increase in the determined session depth or an increase in the time period until the user next accesses the application results in an increase in the determined severity score.

13. A method for determining severity of a crash of an application, comprising:

obtaining incident data indicative of the crash of the application, the crash occurring during an access of the application by a user at a computing device;

determining a session depth at which the crash occurred based upon the incident data;

obtaining time period data indicative of a time period, following the crash, until the user next accesses the application at the computing device;

determining a severity score for the crash based upon the session depth and the time period; and determining and providing a user experience score for the application based upon the crash severity score and a plurality of other indicators of quality of the user's experience with the application.

14. The method of claim 13, wherein the plurality of other indicators of quality of the user's experience with the application include at least one of a speed of application launch, a speed of a user-facing application event other than launch, and a count of non-crash application errors.

15. The method of claim 13, wherein the crash severity score is provided to a third computing device for display.

* * * * *